United States Patent
Cheah et al.

(10) Patent No.: US 6,901,271 B1
(45) Date of Patent: May 31, 2005

(54) DETERMINING THE LAST DIGIT OF A DIALED NUMBER

(75) Inventors: Jonathon Y. C. Cheah, Southlake, TX (US); Zhiping Hu, San Diego, CA (US)

(73) Assignee: Uniden America Corporation, Fort Worth, TX (US)

( * ) Notice: Subject to any disclaimer, the term of this patent is extended or adjusted under 35 U.S.C. 154(b) by 590 days.

(21) Appl. No.: 09/694,580

(22) Filed: Oct. 23, 2000

(51) Int. Cl.[7] .......................... H04Q 7/20; H04M 1/00
(52) U.S. Cl. .................. 455/564; 455/554.2; 455/461; 455/465; 379/352
(58) Field of Search .................. 455/461, 460, 455/465, 418, 426.1, 554.1, 554.2, 564, 557; 379/352, 354, 355

(56) References Cited

U.S. PATENT DOCUMENTS

| | | | |
|---|---|---|---|
| 4,658,096 A | 4/1987 | West, Jr. ...................... | 379/59 |
| 4,775,997 A | 10/1988 | West, Jr. et al. .............. | 379/58 |
| 4,901,307 A | 2/1990 | Gilhousen .................... | 370/18 |
| 5,103,459 A | 4/1992 | Gilhousen ..................... | 375/1 |
| 5,790,631 A | 8/1998 | Minarczik ...................... | 379/2 |
| 5,799,254 A | 8/1998 | Karmi ......................... | 455/528 |
| 6,195,427 B1 * | 2/2001 | Hansen et al. .............. | 379/352 |
| 6,240,277 B1 * | 5/2001 | Bright ....................... | 455/74.1 |
| 6,256,488 B1 * | 7/2001 | Lee et al. .................. | 455/401 |
| 6,285,753 B1 * | 9/2001 | Slusher .................. | 379/355.06 |
| 6,498,940 B1 * | 12/2002 | McKinley ................... | 455/564 |

OTHER PUBLICATIONS

Data Sheet, Microelectronics Group, Lucent Technologies, L8560 Low–Power SLIC with Ringing, Apr. 2000.
QualComm Wireless Telephones, QCT–1000's DCMA Digital Cellular Fixed Wireless Telephone, Undated, pps. 1–2.

* cited by examiner

*Primary Examiner*—Lee Nguyen
*Assistant Examiner*—Yuwen Pan
(74) *Attorney, Agent, or Firm*—Chauza & Handley, LLP; Roger N. Chauza, Esq.

(57) ABSTRACT

A technique for determining the last digit of a dialed sequence. Different interdigit time-out periods are preassigned to each digit received. If the time-out period expires, it is considered that a full complement of digits has been received, whereupon the received digits are then transferred toward the destination.

31 Claims, 3 Drawing Sheets

DETERMINING THE LAST DIGIT OF A DIALED NUMBER

RELATED APPLICATIONS

This patent application is related to U.S. application entitled "Wireless Home/Office Telephone System", filed Jun. 5, 2000, and assigned Ser. No. 09/586,810, the entire disclosure of which is incorporated herein by reference; and related to U.S. application entitled "Wireless Local Loop Communication System Using SLIC Module", filed Jun. 5, 2000, and assigned Ser. No. 09/586,911, the entire disclosure of which is also incorporated herein by reference.

TECHNICAL FIELD OF THE INVENTION

The present invention relates in general to communication systems, and more particularly to systems employing dialed digits for completing a communication path to a destination.

BACKGROUND OF THE INVENTION

In many communication systems, the use of numbers, symbols or digits are utilized to identify a destination. Digits representative of a destination can be automatically transmitted, such as to access an Internet web site, dialed automatically from a telephone to reach a called party, or dialed manually by a user of a communication system. In all of these situations, a full complement of digits must be transmitted in order to be properly interconnected to the correct destination.

In those communication systems where a preset or predetermined number of digits must be dialed, the determination of the last digit dialed is determined relatively easily, in that the receiving system simply counts the number of digits dialed. When the prescribed number of digits have been received, the process is carried out to provide an interconnection to the respective destination. When the prescribed number of digits has not been received, it is a common practice to wait a predefined period of time before transmitting a message or tone to the originating party to indicate the receipt of less than all of the prescribed number of digits. A further period of time may lapse before receipt of the full complement of digits from the originating party, otherwise the communication system waiting for the digits simply disconnects the originating party.

The determination of the last digit dialed in other systems can be more complicated, especially when various destinations can be reached by the dialing of different numbers of digits or symbols. For example, the dialing of the single digit "0" is sufficient to reach an operator for assistance. The same is true in many cases when a three-digit number is dialed to reach an operator or to request emergency assistance. In some cases, a seven-digit number is all that is necessary to reach a called party in the public switched telephone network (PSTN). In more recent times, a ten-digit number is required in order to reach a destination in the PSTN. Yet additional digits may be required in placing international calls, credit card calls and calls made from specialized communication systems. From the foregoing, it can be seen that in these situations, and others, it is insufficient to simply count the number of digits before making a determination that the last digit has been dialed.

In general, standard corded telephone sets, as well as cordless and wireless telephone sets, do not make a determination when the last digit has been dialed. Rather, these telephone sets merely transmit the digits as dialed. For instance, in the corded telephone set, each digit is transmitted individually to the central office or PBX switching system as dialed by the user. In cordless telephone sets, the same is true, except that with certain telephone sets when a full complement of digits has been dialed, the user then simply pushes the "talk" button and the digits are automatically transferred to the central office. Similarly, in cellular telephone sets, when the user has input the full complement of digits, the "send" button is pushed, whereupon a data packet is transmitted to the cellular base station. In these latter two situations, it is not the telephone itself that makes a determination wherein the full complement of digits has been dialed, but rather the user of the telephone.

In many communication systems servicing the equipment of users, such as central office and PBX switching systems, there are circuits or programmed operations that are employed to make a determination as to when the last digit was received from the user equipment. The determination of the last digits dialed expedites the call setup and allows the communication system to be more efficiently utilized. The waiting of an inordinately long period of time for a last digit would unnecessarily tie up the resources of the communication system and thereby prevent other potential users from service thereof. The determination of the last digit dialed is often a feature incorporated in central office and PBX systems, communication systems providing SLIC service, as well as wireless local loop telephone systems.

From the foregoing, it can be seen that a need exists for a technique in determining the last digit of a dialed number sequence. Another need exists for an algorithm that can be easily incorporated into telecommunication equipment for determining the last digit dialed. Yet another need exists for a technique that includes a user-selectable dialing speed schedule best adapted to the dialing habits of the user.

SUMMARY OF THE INVENTION

Disclosed is a technique for determining the last digit dialed of a sequence, which technique overcomes the problems and shortcomings of the prior art communication systems. In accordance with a disclosed embodiment of the invention, there is a programmable time-out period after receipt of each digit. The time-out periods after each received digit are different, depending on which digit in a sequence is received. If the time-out period after the last digit received elapses, then the communication system determines that the digit is the last dialed digit, and proceeds to forward the received digit sequence either to a destination, or to a processor for further processing. In the disclosed embodiment, the user is provided with menu-selectable dialing rate schedules, including a slow dialing rate, a normal dialing rate and a fast dialing rate. The time-out periods after the various digits are different for the different selectable dialing rate schedules.

In accordance with another embodiment of the invention, the time-out periods are determined by the particular digit first received. According to this embodiment, the ten numerals and two symbols of the keypad are separated into two groups. If the first digit dialed appears in one group, then a first schedule of interdigit time-out periods is utilized. On the other hand, if the first digit dialed is one belonging to the second group, then a different schedule of interdigit time-out periods is utilized. Again, after any one of the time-out periods has expired, the system considers that a full complement of digits has been received, and thus proceeds in processing the same.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, components, elements or functions through the views, and in which.

DETAILED DESCRIPTION OF THE INVENTION

In accordance with the disclosed embodiment of the invention, there is illustrated a telecommunication system utilizing standard corded or cordless telephones in conjunction with wireless cellular technology. Such an arrangement maintains the advantage of wireless cellular technology, but does not require users to become familiar and remember the more complicated procedures of the cellular telephone technology. In other words, telephone subscribers presently familiar with either the standard corded or cordless telephones and the usage thereof can utilize such telephones in the traditional manner, but utilize a fixed cellular transceiver for communicating the voice or data information to a remote cellular base station. In connection with an important feature, the communication system 10 includes apparatus for determining the last digit of a dialed sequence to thereby forward the same in a CDMA data packet to the cellular base station.

While the principles and concepts of the invention are described in connection with a cellular-based communication system, the invention can be readily employed in many other communication and computer systems. Indeed, in any system where nonuniform length digit strings are utilized, the invention can be implemented to expedite the transfer of the same and enhance the utilization and efficiency of the system.

Figure 1:
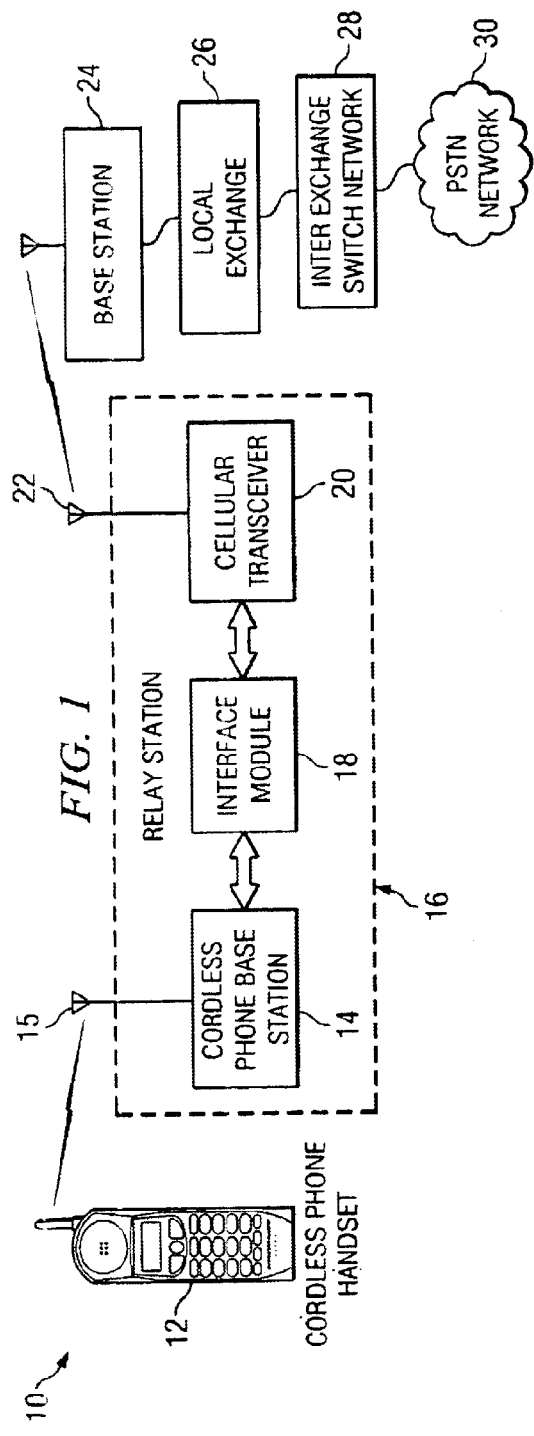
FIG. 1 illustrates a frontal view of a cordless telephone integrated with a cellular transceiver, in which the invention is employed.

In the preferred form of the invention shown in FIG. 1, a cordless telephone base unit 14 is coupled to the cellular transceiver 20 by a hardware interface 18 defined by audio and digital lines. A software portion of the interface 18 resides both in the cordless telephone base unit 14 and in the cellular transceiver 20. The components comprising the relay station 16 are preferably integrated into a single modular unit having one transmit/receive antenna.

FIG. 1 is illustrative of the architecture of the telecommunication system 10 according to a preferred form of the invention. A cordless telephone base unit 14 is illustrated in FIG. 1, as coupled to a cellular transceiver 20 into a single modular unit. In the preferred embodiment, a cordless telephone handset 12 provides wireless voice communications to and from a cordless telephone base unit 14, which comprises part of a relay station 16. Many circuits of the cordless telephone handset 12 and the cordless telephone base unit 14 are of the standard type readily available. The cordless telephone base unit 14 communicates through a hardware and software interface module 18 with the cellular transceiver 20. The cellular transceiver 20 is preferably of the type in which information is transmitted and received by way of the code division multiple access (CDMA) technology.

The interface module 18 of the relay station 16 receives the standard POTS telephone call progress signals from the cordless base unit 14 and converts the same into other signals utilized by the cellular transceiver 20. Since the cordless telephone base unit 14 is responsive to signals such as dial tone, busy signal, etc., the interface module 18 provides such type of signals to the cordless telephone base unit 14 in response to incoming calls from the cellular communication system. The interface module 18 also collects dialed DTMF digits received from the cordless telephone base unit 14 and combines the same with a "send" signal for transfer to the cellular transceiver 20. The cellular transceiver 20 transmits the signals from a fixed antenna 22 according to the CDMA transmission protocol to a remote cellular base station 24. The cellular base station 24 is of standard design defining a cellular "cell" for receiving local CDMA signals from the numerous cellular transceivers utilized by mobile cellular telephones. The CDMA base station 24 can transfer the received signals to a local exchange 26 through either wireless, satellite or land lines. In the other direction, the local exchange 26 communicates telecommunication information to the CDMA base station 24 for transmission therefrom. In addition, the local exchange 26 is connected to an interexchange switch network 28. The interexchange switch network 28 provides an interface between the cellular technology and the public switched telephone network (PSTN) 30. As noted above, the CDMA base station 24, the local exchange 26, the interexchange switch network 28 and the connections therebetween, as well as to the PSTN 30, are all of conventional design and form a part of the present communication infrastructure.

Figure 2:
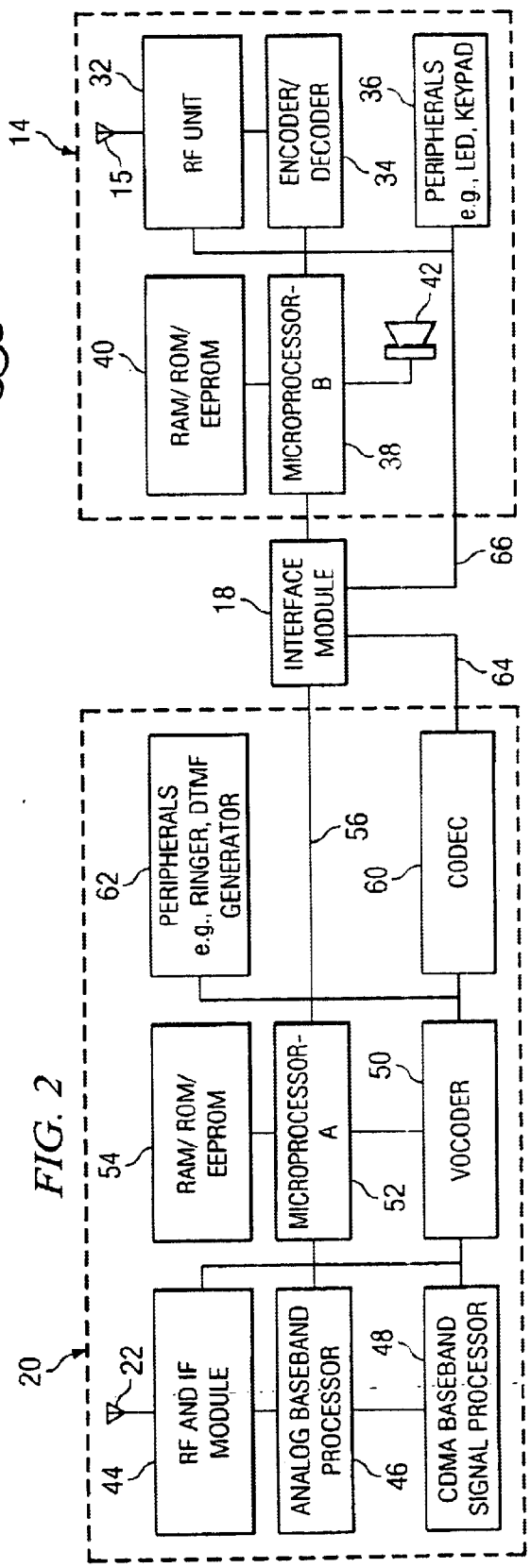
FIG. 2 is a block diagram of the communication unit of FIG. 1.

FIG. 2 is an expanded block diagram of the relay station 16. The cordless telephone base unit 14 includes an RF unit 32 that functions as a transceiver with respect to the fixed cordless telephone antenna 15. While two antennas 15 and 22 are shown, in practice only a single antenna is used for both the cordless telephone base unit 14 and the cellular transceiver 20. The RF unit 32 transmits voice and other signals to the cordless telephone handset 12, as well as receives modulated audio and other signals from the cordless telephone handset 12, via the antenna 15 of the base unit 14. The RF unit 32 is connected to an encoder/decoder 34, as well as to peripheral circuits 36, such as a the visual display, LEDs, keypad, etc. The encoder/decoder 34 is coupled to a programmed microprocessor 38. The microprocessor 38 is supported by various types of memory devices 40, such as random access memory, read only memory and electrically erasable programmable read only memory. The microprocessor 38 also has an output port coupled to a speaker 42. The cordless telephone microprocessor 38 is also programmed with the software that interfaces with audio and digital communications from the cellular transceiver 20.

The digital hardware portion of the interface module 18 is either a serial or parallel communication bus coupled to a UART forming a part of the microprocessor 38 of the cordless telephone base unit 14. In addition, the interface module 18 has bidirectional audio lines 66 coupled to the coder/decoder circuits 34 of the cordless telephone base unit 14.

The cellular transceiver 20 is preferably fixed and is not movable during the use thereof. The cellular transceiver includes an antenna 22 for transmitting and receiving CDMA protocol signals with respect to the cellular CDMA base station 24 (FIG. 1). The antenna 22 of the transceiver 20 is connected to an RF and IF module 44. The RF and IF module 44 is coupled to a CDMA baseband signal processor 48 and to a vocoder 50. An analog baseband processor 46 is coupled to the CDMA baseband signal processor 48. The analog baseband processor 46 as well as the vocoder 50 are connected to a microprocessor 52. The programmed microprocessor 52 is supported by RAM, ROM and EEPROM memory 54. An internal UART of the microprocessor 52 of the cellular transceiver 20 is coupled to the interface module 18 by a digital bus 56. Asynchronous communications are carried out in an RS-232C bus connectorized at each end thereof. The vocoder 50 is coupled by a bus 58 to a codec 60 as well as to peripherals 62, including ringer circuits, DTMF generators, etc. The codec 60 is also coupled to the interface module 18 by a bidirectional analog bus 64.

The transmission of voice and other signals takes place on what is termed a forward channel and a backward (or reverse) channel of the cellular transceiver 20. The signal processing is carried out in the following generalized manner. The RF module 44 of the cellular transceiver 20 receives the incoming CDMA signals via the antenna 22. The CDMA signals received are those transmitted from the CDMA cellular base station 24 of the cellular communication system. The RF signal is converted to an intermediate frequency in the IF portion of module 44 and down converted to a baseband signal by the analog baseband processor 46. The down-converted signal is transferred to the CDMA baseband signal processor 48 where it is demodulated and decoded. Payload information bits are extracted from the down-converted signal and transferred to the vocoder 50 and therethrough to the codec 60, as well as transferred to the microprocessor 52. The microprocessor 52 transfers digitized voice and other signals to the cordless telephone base unit 14 via the serial digital bus 56. The microprocessor 52 controls the codec for transferring DTMF and other analog information or messages to the interface module 18. Any necessary audio signal that is needed in the cordless base unit 14 in connection with the forward-channel signal processing is either generated by the appropriate generator in the peripheral circuits 62 of the cellular transceiver module 20, or passes through the codec 60 and is converted to corresponding analog signals. The analog signals such as ringing signals, dial tone, busy, etc., are passed through the interface module 18 on analog audio bus 64. The interface module 18 transfers the digital information and messages to the microprocessor 38 of the cordless telephone base unit 14. The interface module 18 also passes the analog signals on bus 66 to the peripheral circuits 36 of the cordless telephone base unit 14. The encoded digital information and messages are passed by microprocessor 38 to the encoder portion of the circuit 34. The signal is transferred to the cordless telephone handset 12 through use of the RF unit 32, via the antenna 15.

The signal processing transferred on the backward channel of the cellular transceiver 20 is carried out according to the following. When the subscriber using the cordless telephone handset 12 speaks, the information is transferred over the air and received by the antenna 15 of the cordless telephone base unit 14. The RF unit 32 processes the received signal in the standard manner and passes it to the decoder 34. From the decoder 34, control signal bits are transferred to the microprocessor 38, while voice signals proceed via the interface module 18 on analog line 66 to the codec 60 of the cellular transceiver 20. The microprocessor 38 in the cordless telephone base unit 14 also transfers the necessary information bits and primitive commands to the microprocessor 52 of the cellular transceiver 20, via the serial digital bus 56 of the interface module 18. The CDMA baseband signal processor 48 carries out CDMA modulation, encodes the payload information bits therein, and transforms the same into a CDMA baseband signal. The signal is then up converted to an IF/RF signal by the analog baseband processor 46. The signal is then transferred to the RF and IF module 44 by the analog baseband processor 46. The RF portion of the module 44 causes transmission of the CDMA signal to the cellular base station 24, via the fixed cellular transceiver antenna 22.

The transmission and reception of signals by the cordless telephone handset 12 are carried out in the standard manner. In the preferred form of the invention, the cordless telephone handset 12 preferably operates in the 1.9 GHz or 900 mHz band, but any other type of portable POTS-type of telephone handsets can be utilized in conjunction with the invention. Indeed, various features and advantages of the invention can be realized by utilizing a corded telephone set instead of a cordless handset 12.

The software and other functional features of the communication system 10 are set forth in more detail in pending application Ser. No. 09/586,911 filed Jun. 5, 2000, the disclosure of which is incorporated herein by reference in its entirety.

Figure 3:
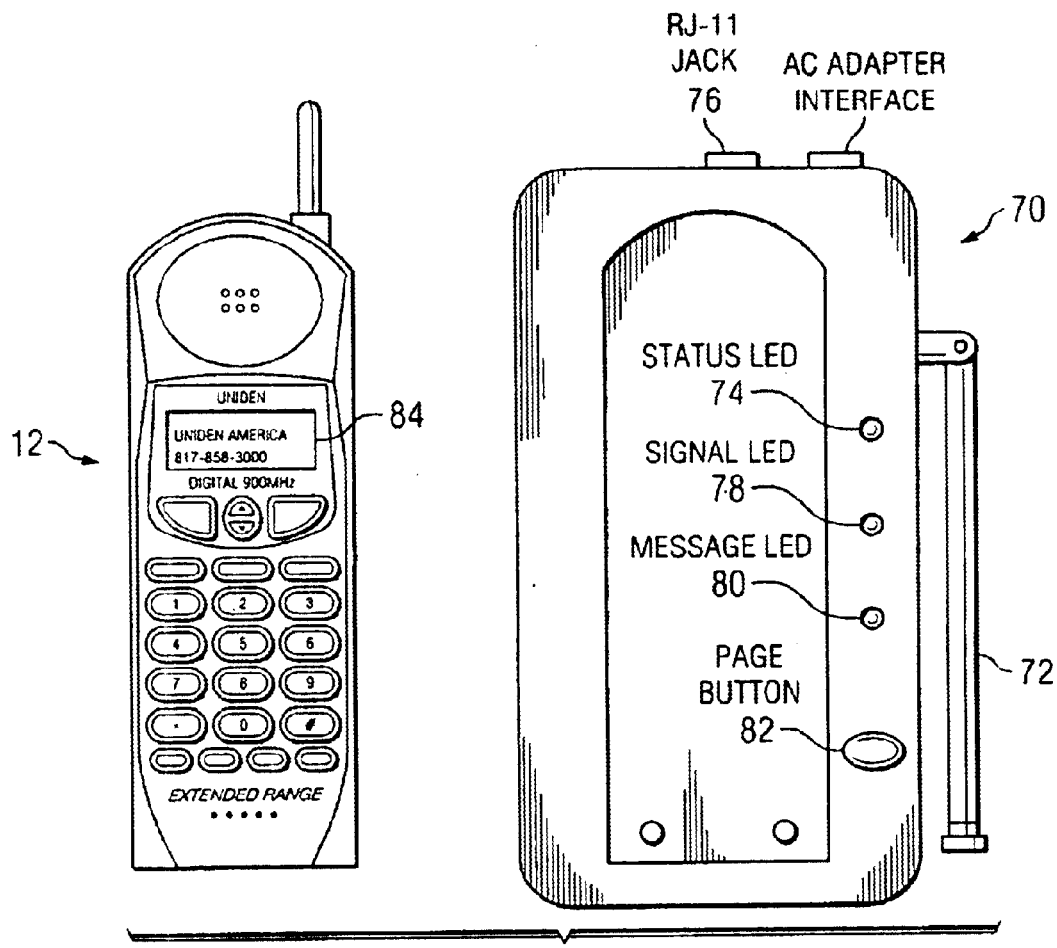
FIG. 3 illustrates an enlarged portion of the cordless telephone shown in FIG. 1.

FIG. 3 illustrates the integrated cellular transceiver and cordless telephone base station 70 which operates in conjunction with the cordless telephone handset 12. While not shown, the standard functions, such as battery charging, are provided by the cordless telephone base station 14. In the preferred form of the invention, the RF unit 32 of the cordless telephone base unit 14 and the RF and IF module of the cellular transceiver 20 utilize the same transmit/receive antenna 72. The operating frequencies of 900 mHz for the cordless telephone base unit 14 and 1.9 gHz for the cellular transceiver 20 can utilize the same antenna 72 for both transmit and receive operations.

The integrated communication system 70 includes a status LED 74 that includes a red and green indicator. When the green indicator is on, this indicates an off-hook condition of the cordless telephone handset 12. When the red indicator is on, the handset battery is charging. When the green LED is off, the handset 12 is in an on-hook condition, but a stand-by mode. When the green indicator is blinking, this means that an externally connected telephone extension (not shown) is off-hook, as connected to the RJ-11 jack 76. When the red indicator is blinking, this means that the battery backup is low and should be charged. When the green LED is blinking, a security code is being transmitted. Signal LED 78 is a green indicator. When the green indicator 78 is on, this means that an acceptable CDMA cellular signal is being received. When the green indicator 78 is blinking, this means that a weak CDMA signal is being received. When the green indicator 78 is off, an insufficient CDMA signal is being received. A message LED 80 is provided on the cordless telephone base station 14. The message LED 564 constitutes an indicator that is red. When the message LED 80 is off, this means that no SMS or voice mail has been activated. When the message LED 80 is blinking, this means that either a new SMS or voice mail message is available. A page button 82 allows a user of the integrated communication system 70 to page the user of the handset 12.

In addition to the foregoing, the cordless telephone handset 12 includes a display 84 for use by the user in scrolling through a number of menu items. The display 84 is driven by MMI software. Scrolling through a menu of items by the cordless telephone handset 12 is carried out by pressing the up arrow or the down arrow on the handset 12 in a conventional manner. Although a number of menu items can be selected, one menu item selectable by the user of the cordless telephone handset 12 is one of a number of dialing speed schedules. In contrast with prior art telephones and associated apparatus, the communication system 70 according to the invention determines when the last digit of a destination has been dialed by the user. As noted above, this facilitates usage of the communication system 70, and prevents unnecessary waiting periods that may accumulate and otherwise tie up the system and prevent usage thereof by other persons.

Rather than provide the same predefined time-out period after the input of each dialed digit, the communication system 70 utilizes different time-out periods as a function of the sequence in which each digit is received. As used herein, "digit" means any symbol, alphabet or number, or combinations thereof, which can be either manually or automatically transferred in a communication system. As can be appreciated, there are a number of reasons why users input digits into a communication system with different interdigit pauses. People unfamiliar with new versions of communications equipment may enter the dialed digits more slowly than persons readily familiar. Elderly people typically dial numbers on a keypad more slowly than other people. In like manner, when one is required to input the dialed number by way of an alphabetic acronym, this takes a little longer to find the particular alphabet symbols on the keypad keys. The slow input of dialed numbers may also be a result of the reading of each digit of a telephone number from a directory, and the inputting of the same by way of a keypad. This is in contrast to other situations where the entry of telephone numbers may be very quick, such as when a person has memorized a number and is readily familiar with the position of the keypad keys. Also, when a particular telephone number, or destination number, has repetitive numbers, or repetitive sequences of numbers, the same is more easily entered into a keypad by the user. Lastly, there are other situations in which some digits may be dialed rather quickly, while other groups of digits are dialed more slowly. For example, when dialing a telephone number from a directory, the area code may be dialed quickly as a three-digit sequence, then the user refers back to the directory for the three-digit exchange number which is then dialed quickly, and lastly the user consults the directory again for the last four-digit sequence, which is then quickly entered into the telephone set. In this situation, the three groups of digits are entered rather quickly, with pauses between the groups of digits.

Table I set forth below illustrates three dialing speed schedules, each defining a sequence in which any digit may be input into the communication system 70, and the corresponding time-out period after the input of the respective digit. After expiration of any one of the time-out periods, the communication system 70 is programmed to consider that a full complement of digits has been input, whereupon the received digits will be processed or otherwise transmitted toward the destination. Those skilled in the art may prefer to utilize a single dialing speed schedule associated with the sequence of digits input. The preferred form of the invention utilizes three different dialing speed schedules. Four or more time-out schedules can also be utilized should the particular situations be amenable to the same. With reference to Table I, there is shown a schedule for slow dialing, normal dialing and fast dialing. The time-out periods after the respective digits input according to the slow dialing schedule are identified as $T_{sn}$, where $_n$ corresponds to the digit input in the sequence. It can be understood that the $_n$ does not correspond to the numeric value of the digit, but rather the order in the sequence in which the digit was input into the communication system by the user. For the normal dialing sequence, the time-out periods are identified as $T_{Nn}$. In like manner, the time-out periods between the digits input by the user according to the fast dialing schedule are identified as $T_{Fn}$. As noted in Table I, the normal dialing speed schedule has time-out periods shorter than those of the slow dialing speed schedule. In like manner, the fast dialing speed schedule has shorter time-out periods than those of the normal dialing speed schedule. Hence, the faster the daling speed schedule selected, the faster the system determines the last digit dialed to thereby facilitate the transfer of the dialed destination number to the destination.

In accordance with an important feature of the invention, the time-out periods between the receipt of the digits in the sequences are different, depending generally in which order the digits were received.

TABLE I

| DIGITS IN PHONE NUMBER | SLOW DIALING | NORMAL DIALING | FAST DIALING |
| --- | --- | --- | --- |
| No digit input | $T_{S0}$ | $T_{N0}$ | $T_{F0}$ |
| Time-out after 1st digit | $T_{S1}$ | $T_{N1}$ | $T_{F1}$ |
| Time-out after 2nd digit | $T_{S2}$ | $T_{N2}$ | $T_{F2}$ |
| Time-out after 3rd digit | $T_{S3}$ | $T_{N3}$ | $T_{F3}$ |
| Time-out after 4th digit | $T_{S4}$ | $T_{N4}$ | $T_{F4}$ |
| Time-out after 5th digit | $T_{S5}$ | $T_{N5}$ | $T_{F5}$ |
| Time-out after 6th digit | $T_{S6}$ | $T_{N6}$ | $T_{F6}$ |
| Time-out after 7th digit | $T_{S7}$ | $T_{N7}$ | $T_{F7}$ |
| Time-out after 8th digit | $T_{S8}$ | $T_{N8}$ | $T_{F8}$ |
| Time-out after 9th digit | $T_{S9}$ | $T_{N9}$ | $T_{F9}$ |
| Time-out after 10th digit | $T_{S10}$ | $T_{N10}$ | $T_{F10}$ |
| Others . . . | $T_S$ . . . | $T_N$ . . . | $T_F$ . . . |

TABLE II

| DIGITS IN PHONE NUMBER | SLOW | NORMAL | FAST |
| --- | --- | --- | --- |
| No digit input | infinite | infinite | infinite |
| 1st digit, 2nd digit time-out period | 5 | 4 | 3 |
| 3rd digit time-out period | 4 | 3 | 2 |
| 4th digit, 5th digit, 6th digit time-out period | 5 | 4 | 3 |
| 7th digit time-out period | 4 | 2.5 | 1.5 |
| 8th digit, 9th digit time-out period | 5 | 3 | 2 |
| 10th digit time-out period | 4 | 2.5 | 1.5 |
| Others from 11th digit time-out period | 4 | 3 | 2 |

Table II illustrates the three dialing speed schedules according to one embodiment, with the interdigit time-out periods shown in seconds. The first interdigit time-out period for each dialing speed schedule ($T_{s0}$, $T_{n0}$ and $T_{f0}$) are all listed as infinite periods of time. These time periods are those that exist before any digit has been entered into the communication system. As a result, when a user receives dial tone and requests service of the communication system, the dial tone will be provided for an infinite period of time to the user until a first digit has been input. Again, those skilled in the art may prefer to provide a preset period of time in which dial tone is provided to the user, and after which the system denies use to the user if no digit has been input.

Figure 4A:
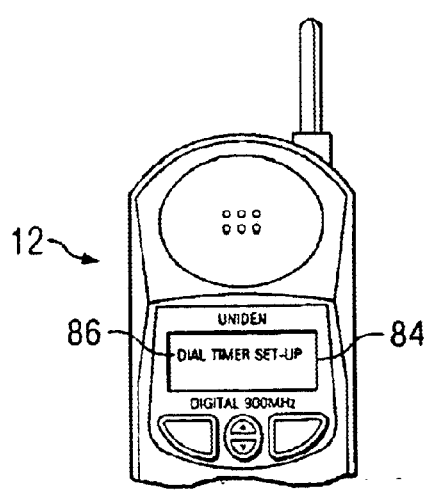
FIGS. 4a and 4b illustrate a portion of the cordless telephone handset, with different menus for allowing a user to select a dialing rate schedule.
Figure 4B:
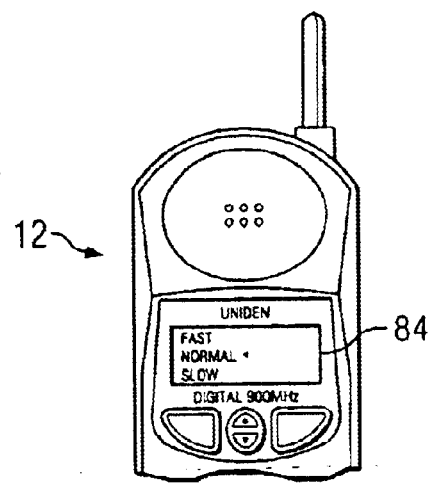

In accordance with an important feature of the invention, there is provided a user-selectable dialing speed schedule best adapted for that of the particular user. In other words, users who typically input dialed digits at a slow pace, may select the slow dialing speed schedule, whereas those who typically input digits at a high rate of speed can select the fast dialing schedule. Lastly, those who consider the entry of digits to be at a normal speed, can select the normal dialing speed schedule. FIGS. 4a and 4b illustrate the programmed operations for allowing the user to select any one of the three dialing speed schedules. It should be mentioned that once a dialing speed schedule has been selected and operated, the other dialing speed schedules can thereafter be selected and utilized.

In order to select the dialing speed schedule on the telephone handset 12, a "menu" key is first pressed on the keypad to bring up the menu selections. The user can use the up-arrow and down-arrow to select the menu item "dial timer-setup" 86 as noted in FIG. 4a. Next, the "select" key of the keypad is pressed to select the menu, whereupon the display shown in FIG. 4b is presented. Here, the user has the option of selecting the "fast," "normal" or "slow" dialing speed schedules. In order to select one of the dialing speed schedules, the up-arrow and down-arrows are utilized to place the cursor next to the speed of the dialing schedule desired. Once the cursor is located next to the menu items, fast, normal, or slow, the select key is again pushed to select the dialing speed schedule that will be utilized in determining the last digit dialed of a destination number.

In the event that a user does not enter or otherwise select a dialing speed schedule, the "normal" dialing speed schedule is automatically preselected. In other words, the normal dialing speed schedule is a default selection. It should be noted that the dialing speed schedules are programmed in the microprocessor 52 of the cellular transceiver 20 portion of the communication system 10 (FIG. 2). Accordingly, the selection of a dialing speed schedule by a user of the cordless telephone handset 12 is communicated via the antenna 15 to the cordless telephone base station 14. One or more primitive commands are generated and transferred via the interface 18 to the cellular transceiver 20. The microprocessor 52 in the cellular transceiver 20 is therefore apprised of the selection by the user of a particular dialing speed schedule. In addition to those primitive commands set forth in the pending U.S. applications identified above, an additional primitive command is utilized for transferring from the microprocessor 38 of the cordless telephone base station 14 to the microprocessor 52 of the cellular transceiver 20, the particular dialing speed schedule selected. The primitive command is set forth below.

Primitive name: time-out parameter change

Description: this primitive is generated by the microprocessor 38 of the cordless base station, and identifies a dialing speed schedule selected by the user. Depending on the sequence in which the digit was dialed by the user, a time-out period in seconds is established for such dialed digit. If the time-out period expires, the cellular transceiver 20 transmits an Origination Message to the cellular base station 24 to initiate an outgoing call.

Data Selection: Identifies the dialing speed selection and the corresponding interdigit time-out periods.
0×00, slow dialing,
0×01, normal dialing (default selection),
0×02, fast dialing.

The data characterized by the entries of TABLE II can be stored in a memory in numerous different ways. Those skilled in the art can readily provide programmed instructions for a processor so that when a particular dialed digit is identified, a corresponding time-out period can be associated therewith, as a function of the dialing speed schedule selected by the user.

Figure 5:
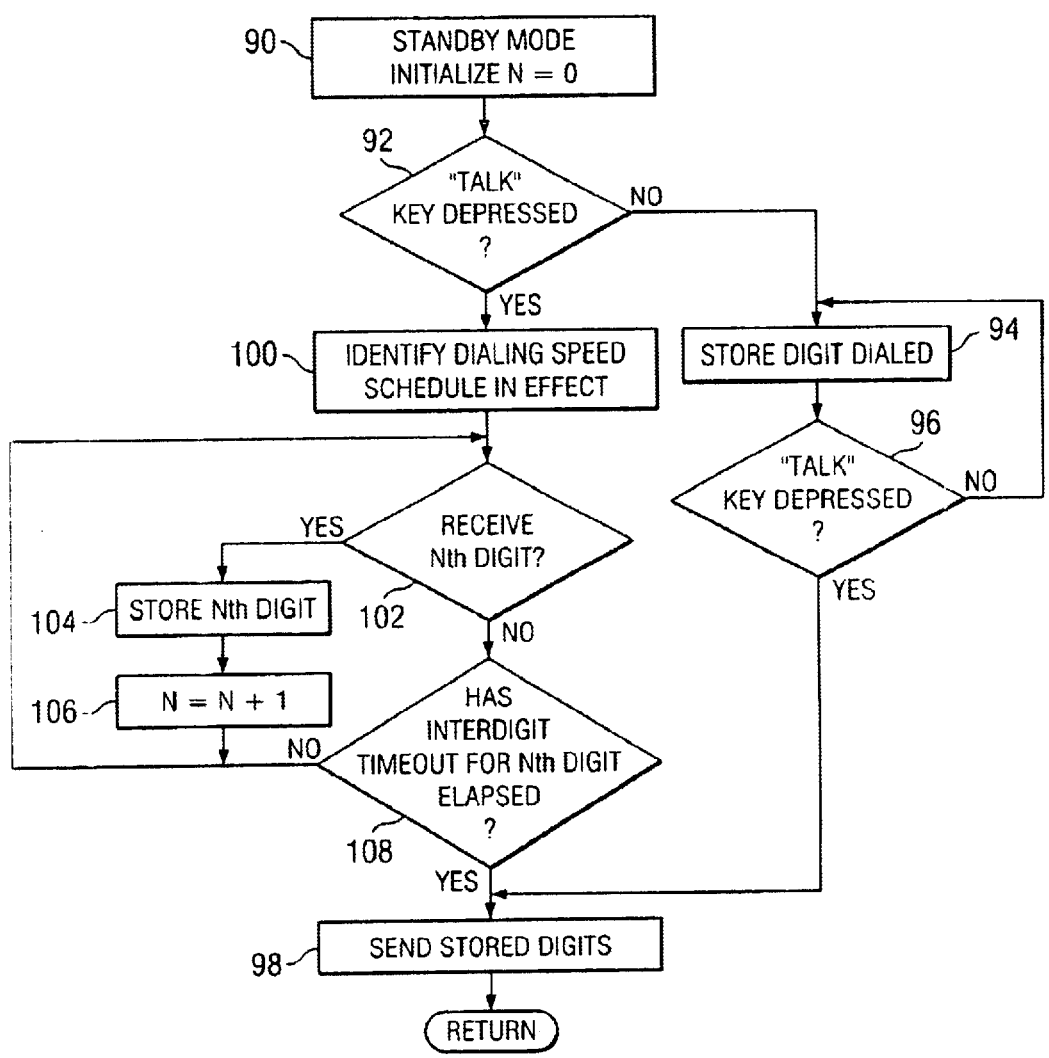
FIG. 5 is a flowchart illustrating the operation of the invention in accordance with one embodiment thereof

FIG. 5 illustrates a software flowchart depicting the programmed operations of the cellular transceiver microprocessor 52 in determining the last digit dialed by a user. It is understood that the invention can be carried out in many different ways, using programmed operations and sequences other than that shown in FIG. 5. In any event, the cellular transceiver microprocessor 52 is initially in a standby mode, as noted by reference numeral 90. Here, a variable N is set to equal 0. The variable generally denotes the sequence in which a digit is received. For this instance, the variable corresponds to the numeric subscript in Table I. From program flow block 90, the microprocessor 52 proceeds to decision block 92, where it is determined whether or not the talk key of the cordless handset 12 has been depressed. If not, program flow branches to block 94 where digits dialed, if any, are stored in the memory 54. Processing then proceeds to decision block 96, where it is again determined if the "talk" key of the keypad has been depressed. If not, processing branches back to block 94 where further digits, if any, are collected. When the talk key is depressed by the user after the full complement of digits has been entered, processing branches from decision block 96 to block 98 where the stored digits are transmitted. As noted above, the stored digits are transmitted by the cellular transceiver 20 with an "Origination Message" to cellular base station 24. The Origination Message is a data packet that includes the dialed digits and many other data fields that are conventionally used with the CDMA cellular protocol when the "send" key is depressed by the user. Processing returns to the standby mode, as noted by block 90. In the foregoing programmed operations, namely, when digits are entered into the cordless telephone handset 12 prior to the pressing of the talk key, the digits are simply collected and transmitted when the talk key is depressed. In this situation, it is the user who determines when the end of the dialing sequence has occurred, by the manual operation of the talk key.

In the event the talk key has been depressed before dialing, processing branches from decision block 92 to program flow block 100, where the microprocessor 52 identifies which dialing speed schedule is presently in effect. As noted above in connection with the described embodiment, the user can select any one of the three dialing speed schedules, namely a slow, normal or fast dialing speed schedule. If no dialing speed schedule is selected by the user, the default is the normal dialing speed schedule. In any event, processing proceeds from block 100 to decision block 102. Here, the microprocessor 52 determines whether the Nth digit has been received. As initialized in program flow block 90, N initially is set to 0, and thereafter incremented as a function of each subsequent digit input by the user. If the Nth digit has been received, processing branches to block 104, where the Nth digit dialed by the user is stored in the memory 54. Then, in program flow block 106, the number N is incremented by 1 and processing returns to the input of decision block 102 where it is determined if the next digit has been received. As subsequent digits are received, they are stored and the number N is then incremented. In the meantime, if the Nth digit has not been received as determined by decision block 102, processing branches to decision block 108 where it is determined whether the interdigit time-out for the Nth digit has elapsed. The time-out period for the Nth digit is determined by the particular dialing speed schedule identified in program flow block 100. In accordance with a feature of the invention, the interdigit time-out period is not the same for each dialed digit, but rather can be different. If the interdigit time out has not expired by the time the subsequent digit has been received, processing branches from decision block 108 back to the input of decision block 102 where the receipt of the next digit is carried out. If, on the other hand, the interdigit time out has elapsed, as determined by decision block 108, processing branches to program flow block 98, where the digits stored thus far are sent in a data packet, along with a "send" command, to the cellular base station 24.

The microprocessor 52 in the cellular transceiver 20 is of the type having an internal hardware timer that is programmable. The internal timer can be programmed after the receipt of a digit to a time period specified in the respective dialing speed schedule. Once the timer has expired, it interrupts the microprocessor 52 and the microprocessor 52 proceeds to program flow block 98 to transfer the digits collected from the user. While the timer function is carried out by a hardware timer in the preferred embodiment, such function can be carried out by software, as well as in many other ways.

From the foregoing, it can be appreciated that as soon as an interdigit time-out period has elapsed, the communication system 10 determines that a full complement of digits has been input, and thus such digits are packetized or otherwise transmitted toward the destination. While the foregoing describes the embodiment in terms of the transmission of a packet of dialed digits, together with a "send" signal, this is not a necessity for the practice of the invention. Rather, the stored digits that are determined to be a full complement can simply be sent in any manner, whether by tones or digital signals, toward the destination or toward a processor for further processing.

The time-out periods set forth above in connection with the various dialing speed schedules can be determined on a statistical basis, based on a sampling of a large number of persons dialing various types of destination numbers. A statistical study can be undertaken to determine the typical interdigit pauses in dialing various types of telephone numbers, based on the large number of communication system users. However, many other algorithms and schemes for determining the time-out periods can be utilized. For example, the processor 52 can be programmed to store destination numbers that are the most likely to be called by a user of the cordless telephone handset 12. This can be determined by storing the destination numbers previously input by the user, and the frequency of use thereof. When the user begins to input digits, the processor 52 can attempt to find a match between the previously dialed digits, and the digits presently input. As long as there continues to be a match between the previously dialed digits and the sequence of digits being input by the user, no time-out periods may be involved. However, time-out periods may thereafter be involved if there is no match between the digits being input by the user and the previously stored digits.

The time-out periods assigned to the various digits can also be determined by defining two or more groups of digits capable of being input by a user. In accordance with another embodiment of the invention, it has been found that dialing can be expedited by defining the digits with a pound sign, asterisk and the numeral in one group (Group 1), and the digits 0 and 2–9 in another group (Group 2). In accordance with this embodiment, two dialing speed schedules are defined, and one is automatically selected by the microprocessor 52 based upon the first digit dialed by the user. If the first digit dialed by the user belongs to the digits of Group 1, then the Group 1 dialing speed schedule is employed. On the other hand, if the first digit dialed by the user belongs to the Group 2 digits, then the second dialing speed schedule is employed. The first dialing speed schedule for the Group 1 digits (#, *, 1) is set forth below.

1) After the dialing of the first digit from Group 1 by the user, the interdigit pause thereafter is 2T, where T is a predefined time period, such as one second.
2) The time-out period between each of the next three digits is $\Delta T$, where $\Delta T$ is an incremental portion of T.
3) The time-out period after the fourth digit is T.
4) The interdigit time-out period between the next three digits is $2\Delta T$.
5) The interdigit time-out period after the seventh digit is T.
6) The interdigit time-out period between all subsequent digits is $2\Delta T$.

In the event the first digit dialed by the user belongs to Group 2 (0,2–9), then the dialing schedule is as set forth below:

1) The interdigit time-out period between the first three digits is T.
2) The interdigit time-out period after the fourth digit is 2T.
3) The interdigit time-out period between the next three digits is $2\Delta T$.
4) The interdigit time-out period after the seventh digit is T.
5) The interdigit time-out period between all subsequent digits is $2\Delta T$.

The foregoing dialing schedules are considered appropriate for expediting the dialing in view that users generally dial destination numbers according to the following grouping of numbers:

Group 1 * or #, plus 2 digits
"1"+3 digits+4 digits
Group 2 3 digits
3 digits+4 digits
3 digits+3 digits+4 digits
3 digits+2 digits+1 digit+3 digits+4 digits
3 digits+2 digits+1 digit+4 digits+3 digits The interdigit time-out periods set forth in the first and second schedules associated with the groups above are correlated to the digit patterns most commonly used by persons in dialing routine destination numbers.

The implementation of the two dialing schedules based on the two groups of digits can be carried out by the cellular transceiver processor 52 by first identifying the first digit input by the user. The first digit input will then be correlated to one group or the other, and then the interdigit time-out periods of the selected schedule will be utilized in defining the time-out periods of the subsequent digits input by the user. Again, if the respective time-out period expires after any one of the digits, the microprocessor 52 considers that a full complement of digits has been received, and will proceed to transmit the digits to the cellular base station 24.

From the foregoing, disclosed are various techniques for determining the last digit dialed in a sequence. The interdigit time-out periods are different for the various digits, thereby facilitating the transfer of the full complement of digits and reducing unnecessary waiting times.

While the preferred and other embodiments of the invention have been disclosed with reference to a specific algorithm, equipment and corresponding circuits and methods of operation thereof, it is to be understood that many changes in detail may be made as a matter of engineering and programming choices, without departing from the spirit and scope of the invention, as defined by the appended claims.

What is claimed is:

1. A method of determining the last digit of a dialed number, comprising the steps of:
   storing in a memory table respective time-out periods associated with a plurality of digit positions, a length of at least two time-out periods being different;
   receiving a sequence of dialed digits;
   for each digit received, identifying its position in the sequence of dialed digits; using the position of each dialed digit as a cross reference to the memory table to find a respective time-out period; and
   if the respective time-out period for a dialed digit expires before a subsequent dialed digit is received, transmitting the received dialed digits.

2. The method of claim 1, further including processing a time-out period by a processor controlled by a cellular transceiver.

3. The method of claim 1, further including transmitting a digit receive command to a processor to initiate counting the time-out period stored in association with that digit in the digit string.

4. The method of claim 3, further including in response to an expiration of said time-out period, transmitting the received digits to a cellular base station.

5. The method of claim 4, further including appending a cellular send command with the transmitted digits.

6. The method of claim 1, further including providing different time-out schedules as a function of a dialing speed of a user.

7. The method of claim 6, further including providing user selection of each said dialing speed schedule.

8. The method of claim 7, further including providing user selection of the dialing speed schedules by way of a menu.

9. The method of claim 8, further including providing a slow, medium and fast dialing speed schedule.

10. The method of claim 1, further including assigning a length of each time-out period as a function of the first digit received.

11. The method of claim 10, wherein said time-out periods define a time-out schedule, and further including defining plural groups of digit strings, where each group contains mutually exclusive digits, and providing a different time-out schedule associated with each group.

12. The method of claim 11, further including identifying to which group the first dialed digit received belongs, and using the respective time-out schedule for associating the time-out periods thereof with the dialed digits received.

13. A processor programmed to carry out the steps of claim 1.

14. A method of determining the last digit of a dialed number, comprising the steps of:
   storing in a memory table a plurality of time-out periods, each time-out period corresponding to a digit position of dialed digits, and ones of said time-out periods being different lengths of time;
   receiving and collecting dialed digits in a sequence as dialed;
   after each dialed digit is collected, consulting the memory table to find a corresponding time-out period for the dialed digit;
   waiting after receipt of each said dialed digit; and
   if the time-out period for the received dialed digit expires before receipt of a subsequent dialed digit, transmitting the collected dialed digits together.

15. The method of claim 14, further including transmitting the collected digits without the time-out period therebetween.

16. The method of claim 14, further including assigning different time-out periods as a function of the sequence in which the digit was received.

17. The method of claim 14, further including providing plural dialing speed schedules that are selectable, where the same digit of a sequence has different time periods in each said schedule.

18. The method of claim 17, wherein said dialing speed schedules are selectable prior to entry of the dialed number.

19. The method of claim 14, further including defining plural groups, each group containing mutually exclusive digits that can be dialed, and assigning time-out periods to digits dialed in a sequence based on the groups, and selecting the time-out periods of a group as a function of a first digit dialed.

20. The method of claim 19, further including assigning the digits *, # and 1 to one group and assigning the digits 0 and 2–9 to another group.

21. A digit receiver for determining the last digit of a dialed number, comprising:
   a digit receiver for receiving digits representative of a destination for communication therewith;
   a memory for storing the received digits;
   a memory table cross-referencing each digit position of a sequence of dialed digits with a respective time-out period, where at least two of said time-out periods are different lengths of time;
   a processor programmed to identify a digit position of each digit received, and for using the digit position for finding a corresponding time-out period in said memory table assigned to the received digit; and
   said processor programmed to respond to an expiration of a time-out period for transmitting the received digits.

22. The digit receiver of claim 21, further including plural dialing speed schedules, where a corresponding digit position has a different time-out period in each said schedule.

23. The digit receiver of claim 22, further including a slow, normal and fast dialing speed schedule.

24. The digit receiver of claim 21, wherein said processor is programmed to set a timer corresponding to each said time-out period.

25. A method of determining the last digit of a dialed number, comprising the steps of:
   providing a plurality of dialing speed schedules, each dialing speed schedule having digit positions associated with respective time-out periods, where the time-out periods for each time-out schedule can be programmed to different time-out periods;
   allowing selection of one dialing speed schedule prior to dialing digits of the dialed number;
   whereby as each digit in a sequence of dialed digits is received, a position of the received dialed digit is cross-referenced in the selected the dialing speed schedule to determine the associated time-out period; and
   transmitting the received dialed digits on the first occurrence of an expiration of a time-out period.

26. The method of claim 25, further including providing a slow, normal and fast dialing speed schedule, where the time-out periods for the normal dialing speed schedule are generally shorter than the corresponding time-out periods for the slow dialing speed schedule, and the time-out periods for the fast dialing speed schedule are generally shorter than the corresponding time-out periods for the normal dialing speed schedule.

27. The method of claim 25, wherein the time-out period is assigned to a digit as a function of the sequence in which the digit was received.

28. The method of claim 26, further including providing menu-selectable dialing speed schedules.

29. The method of claim 1, further including sequentially comparing each digit of the dialed number with a pre-stored number, and if a match of the digits is found, inhibiting transmission of the collected dialed digits even if a time-out period has expired.

30. The method of claim 1, further including providing a button on a telephone having a "talk" function, and inhibiting transmission of the dialed digits in response to any time-out expiration if the talk button was not activated before dialing the dialed digits.

31. The method of claim 30, further including providing the talk button on a cordless telephone providing POTS.

\* \* \* \* \*